(12) United States Patent
Faletti et al.

(10) Patent No.: US 11,993,467 B2
(45) Date of Patent: *May 28, 2024

(54) INSTRUMENT CONVEYANCE USING A SHUTTLE

(71) Applicant: Capital One Services, LLC, McLean, VA (US)

(72) Inventors: Steve Faletti, Brooklyn, NY (US); David Kelly Wurmfeld, Fairfax, VA (US); Scott R Neilson, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/655,182

(22) Filed: Mar. 17, 2022

(65) Prior Publication Data
US 2022/0250857 A1    Aug. 11, 2022

Related U.S. Application Data

(62) Division of application No. 17/248,808, filed on Feb. 9, 2021, now Pat. No. 11,279,571.

(51) Int. Cl.
*B65G 51/06* (2006.01)
*B65G 51/36* (2006.01)

(52) U.S. Cl.
CPC ............. *B65G 51/36* (2013.01); *B65G 51/06* (2013.01)

(58) Field of Classification Search
None
See application file for complete search history.

(56) References Cited

U.S. PATENT DOCUMENTS

| | | | |
|---|---|---|---|
| 3,711,038 A | | 1/1973 | Van Otteren |
| 3,892,372 A | | 7/1975 | Hauber |
| 3,949,364 A | | 4/1976 | Clark et al. |
| 4,135,684 A | | 1/1979 | Willey |
| 4,219,290 A | * | 8/1980 | Golston ................ B65G 51/06 406/186 |
| 4,470,730 A | | 9/1984 | Wuthrich |
| 5,092,714 A | | 3/1992 | Porter et al. |
| 5,101,979 A | | 4/1992 | Uno et al. |
| 5,896,297 A | | 4/1999 | Valerino, Sr. |
| 6,015,246 A | * | 1/2000 | Yamane ................ B65G 51/06 406/189 |

(Continued)

*Primary Examiner* — Joseph A Dillon, Jr.
(74) *Attorney, Agent, or Firm* — Harrity & Harrity, LLP

(57) ABSTRACT

A system for instrument conveyance may include at least one handling unit configured to dispense or accept instruments; at least one head unit configured to obtain input from a user in connection with a transaction involving instruments, where the at least one head unit includes a presentation opening between an interior side and an exterior side of the at least one head unit; a transportation system disposed between the at least one handling unit and the at least one head unit; and a shuttle device configured to transport instruments between the at least one handling unit and the at least one head unit via the transportation system, where the shuttle device includes an internal compartment for containing instruments, and where the shuttle device is configured to expose the internal compartment to the exterior side of the at least one head unit via the presentation opening.

20 Claims, 6 Drawing Sheets

(56) References Cited

U.S. PATENT DOCUMENTS

| | | |
|---|---|---|
| 6,146,057 A | 11/2000 | Gromley et al. |
| 7,328,084 B1 | 2/2008 | Hoganson et al. |
| 7,424,340 B2 | 9/2008 | Owens |
| 7,980,792 B2 | 7/2011 | Siddle et al. |
| 8,029,212 B2 | 10/2011 | Valerino, Sr. |
| 8,322,601 B1 | 12/2012 | Benore et al. |
| 8,500,373 B1 | 8/2013 | Epps |
| 8,644,985 B2* | 2/2014 | Hoganson ............... G05B 11/44 700/225 |
| 8,825,203 B2 | 9/2014 | Valerino, Sr. |
| 8,958,906 B2 | 2/2015 | DePietro et al. |
| 9,033,214 B2 | 5/2015 | Siddle et al. |
| 9,256,864 B2* | 2/2016 | Gromley ............... G07F 19/202 |
| 9,914,554 B2* | 3/2018 | Lokkers ............... B65G 43/00 |
| 10,013,685 B2* | 7/2018 | Gromley ............... G06Q 40/12 |
| 10,023,402 B2* | 7/2018 | Hoganson ............... B65G 51/44 |
| 10,621,833 B1 | 4/2020 | Dadhaniya et al. |
| 10,665,065 B2 | 5/2020 | Faletti |
| 11,059,681 B2 | 7/2021 | Lathan |
| 11,279,571 B1 | 3/2022 | Faletti |
| 11,699,331 B1* | 7/2023 | DiGangi ............... G07F 19/203 235/7 R |
| 2001/0056311 A1 | 12/2001 | Valerino, Sr. |
| 2003/0044243 A1 | 3/2003 | Tisdale |
| 2004/0253061 A1 | 12/2004 | Moller |
| 2005/0096775 A1 | 5/2005 | Wang et al. |
| 2008/0147234 A1 | 6/2008 | Biegelsen et al. |
| 2009/0146366 A1* | 6/2009 | Siddle ............... G07D 11/165 271/11 |
| 2010/0030345 A1 | 2/2010 | Cole et al. |
| 2010/0094451 A1 | 4/2010 | Hoganson et al. |
| 2010/0312379 A1 | 12/2010 | Pedrazzini |
| 2011/0052351 A1 | 3/2011 | Voelker |
| 2011/0255945 A1* | 10/2011 | Siddle ............... G07D 11/165 414/751.1 |
| 2011/0270440 A1 | 11/2011 | Hoganson et al. |
| 2012/0209421 A1 | 8/2012 | Valerino, Sr. |
| 2014/0081448 A1 | 3/2014 | Hoganson |
| 2014/0121830 A1* | 5/2014 | Gromley ............... G06Q 40/12 700/236 |
| 2014/0214198 A1* | 7/2014 | Depietro ............... G07F 19/205 700/231 |
| 2015/0274441 A1 | 10/2015 | Jones et al. |
| 2017/0183169 A1 | 6/2017 | Wolfe et al. |
| 2018/0319607 A1 | 11/2018 | Nemati et al. |
| 2020/0361721 A1* | 11/2020 | Lathan ............... B65G 51/42 |
| 2021/0114824 A1 | 4/2021 | Dahl et al. |
| 2022/0234843 A1* | 7/2022 | Cumby Beeks ....... B65G 51/40 |
| 2022/0250853 A1* | 8/2022 | Faletti ............... G05B 19/042 |

* cited by examiner

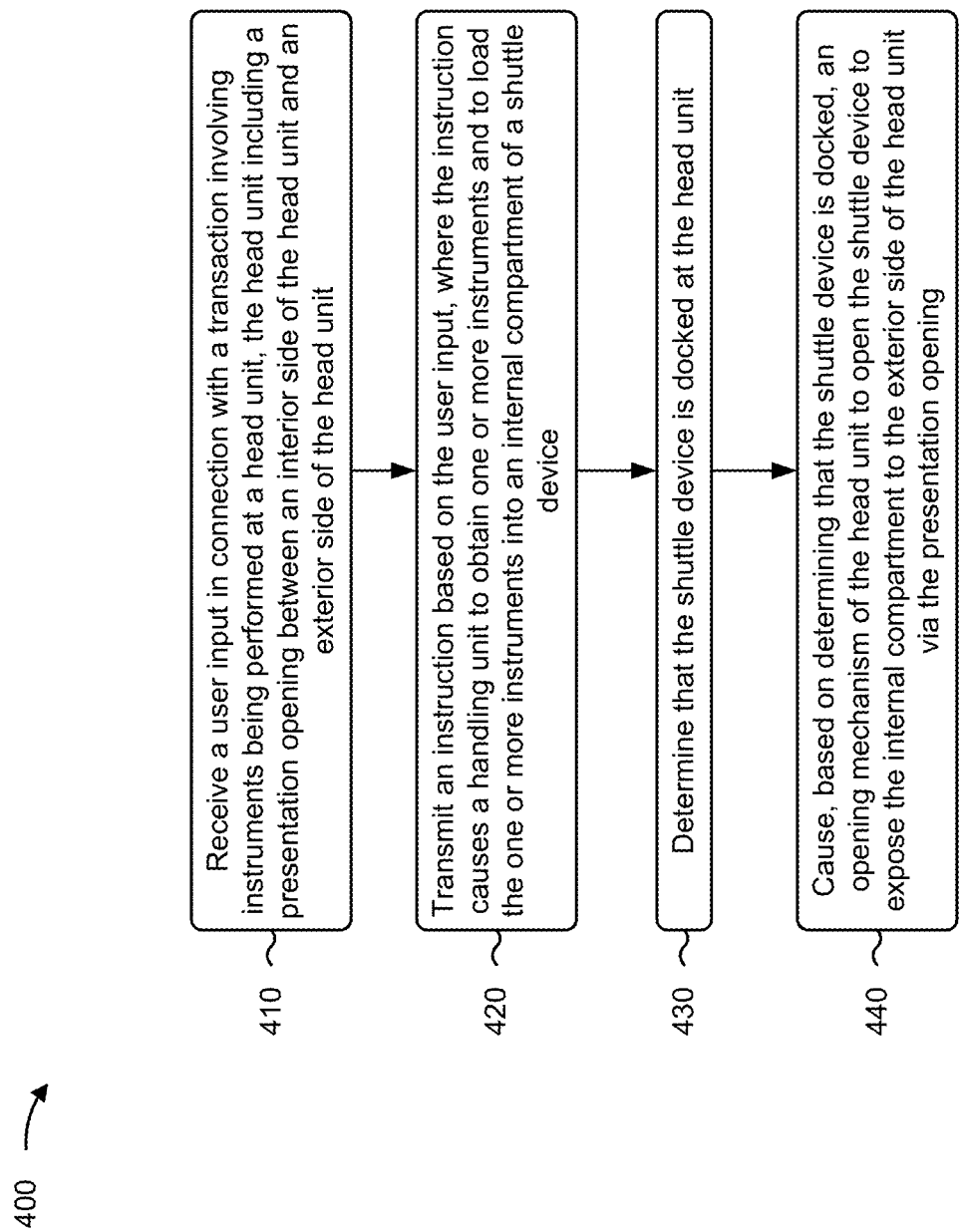

INSTRUMENT CONVEYANCE USING A SHUTTLE

RELATED APPLICATION

This application is a divisional of U.S. patent application Ser. No. 17/248,808, filed Feb. 9, 2021 (now U.S. Pat. No. 11,279,571), which is incorporated herein by reference in its entirety.

BACKGROUND

An automated teller machine (ATM) is an electronic device that enables users to perform transactions without having to interact with other people. Such transactions may include depositing or withdrawing cash, depositing checks, and/or reviewing account information, among other examples.

SUMMARY

In some implementations, a system for instrument conveyance includes at least one handling unit configured to dispense or accept instruments; at least one head unit configured to obtain input from a user in connection with a transaction involving instruments, where the at least one head unit includes a presentation opening between an interior side of the at least one head unit and an exterior side of the at least one head unit; a transportation system disposed between the at least one handling unit and the at least one head unit; and a shuttle device configured to transport instruments between the at least one handling unit and the at least one head unit via the transportation system, where the shuttle device includes an internal compartment for containing instruments, and where the shuttle device is configured to expose the internal compartment to the exterior side of the at least one head unit via the presentation opening.

In some implementations, a head unit includes one or more input devices configured to obtain input from a user in connection with a transaction involving instruments; a presentation opening between an interior side of the head unit and an exterior side of the head unit; a shuttle dock configured to dock a shuttle device at the presentation opening; and an opening mechanism configured to open the shuttle device to expose an internal compartment of the shuttle device to the exterior side of the head unit via the presentation opening.

In some implementations, a method of instrument conveyance includes receiving, by a processor, a user input in connection with a transaction involving instruments being performed at a head unit, the head unit including a presentation opening between an interior side of the head unit and an exterior side of the head unit; transmitting, by the processor, an instruction based on the user input, where the instruction causes a handling unit to obtain one or more instruments and to load the one or more instruments into an internal compartment of a shuttle device; determining, by the processor, that the shuttle device is docked at the head unit; and causing, by the processor and based on determining that the shuttle device is docked, an opening mechanism of the head unit to open the shuttle device to expose the internal compartment to the exterior side of the head unit via the presentation opening.

BRIEF DESCRIPTION OF THE DRAWINGS

FIG. 4 is a flowchart of an example process relating to instrument conveyance using a shuttle.

DETAILED DESCRIPTION

Figure 1A:
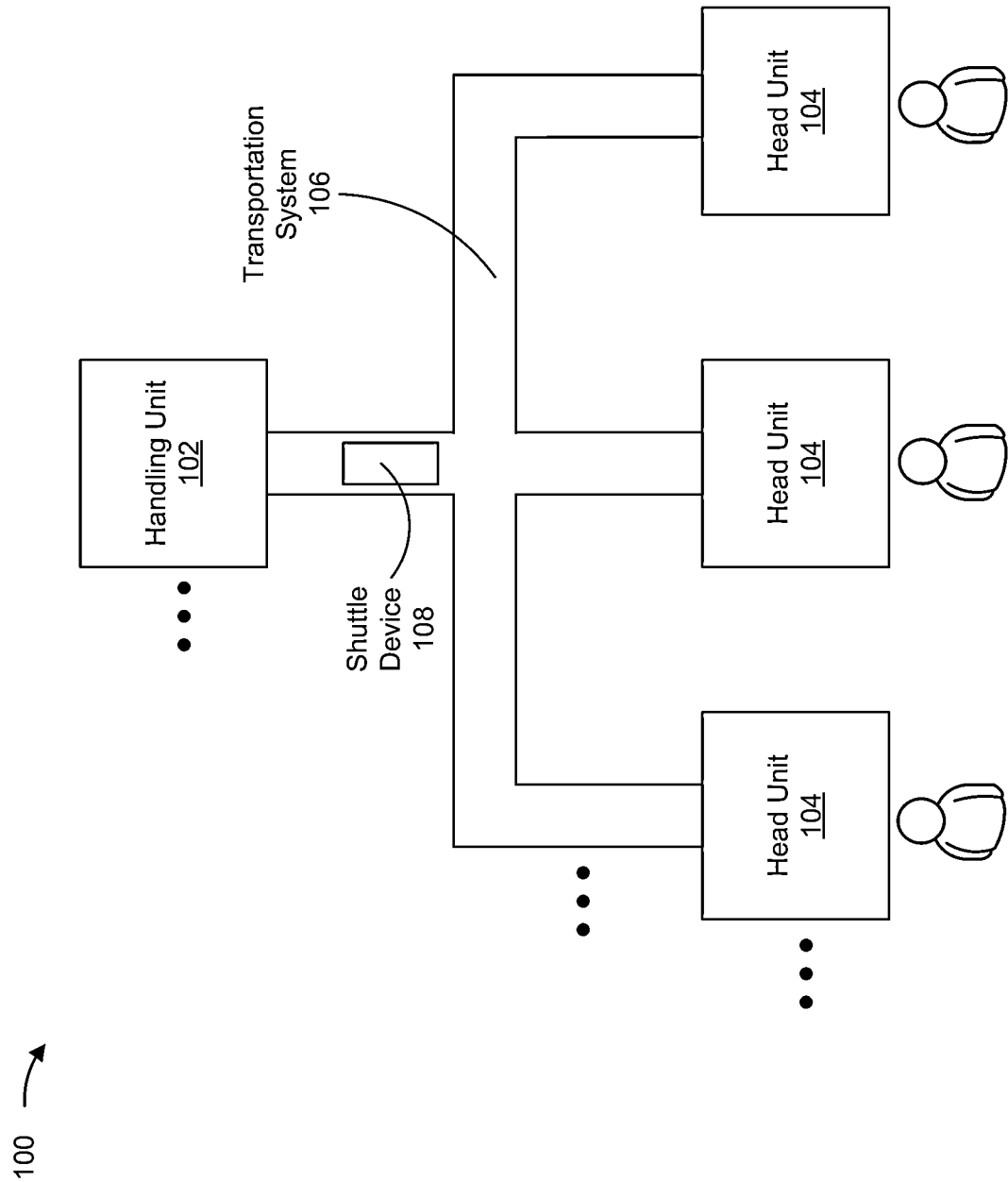
FIGS. 1A-1C are diagrams of an example implementation relating to instrument conveyance using a shuttle.

The following detailed description of example implementations refers to the accompanying drawings. The same reference numbers in different drawings may identify the same or similar elements.

An ATM includes a user-facing (e.g., a customer-facing) presenter opening through which a user may remove or insert instruments (e.g., cash, notes, checks, or other bank media) in connection with a transaction performed at the ATM. Due to difficulties in moving instruments long distances (e.g., using conveyors or rollers) storage components (e.g., a safe or a vault) for instrument dispensing, depositing, and/or recycling are typically enclosed in the ATM in close proximity to the presenter opening. Thus, these storage components are located in vulnerable areas that are publicly accessible. For example, it is common for the presenter opening to be used as a conduit to access the storage components during an attack on the ATM. The attack on the ATM may result in theft of the stored instruments as well as damage to the ATM.

In some cases, a financial institution may employ a shuttle in a pneumatic conduit system to convey instruments between a teller, located in a protected area, and a user located in a publicly-accessible area. However, these systems require a substantial amount of manual interaction from the teller and the user. For example, in a typical scenario, the teller manually loads instruments into the shuttle and places the shuttle into the conduit system. Continuing with the example, the user removes the shuttle from the conduit system, opens the shuttle, and retrieves the instruments. Thus, current conduit systems are inefficient, provide a poor user experience, and expose the shuttle to theft or damage.

Some implementations described herein provide a system for instrument conveyance that solves the problems described above. The system may include a handling unit (e.g., for instrument dispensing, depositing, and/or recycling) that is not user facing or publicly accessible, and a head unit that is user facing and publicly accessible. Instruments are stored at the handling unit, rather than at the head unit, for protection from theft. Accordingly, the system conserves resources (e.g., computing resources and/or network resources) that would have otherwise been used to identify, investigate, and mitigate theft. Moreover, because the instruments are not stored at the head unit, thieves are less likely to attempt an attack of the head unit, thereby reducing the incidence of damage to the head unit and permitting greater uptime of the head unit.

The system may also include a transportation system (e.g., a conduit system) configured to transport a shuttle that carries instruments between the handling unit and the head unit. In some implementations, the head unit does not include a presenting mechanism for presenting instruments to a user. Rather, the shuttle carrying instruments may be docked to the head unit and automatically opened to present the instruments to a user. In this way, the shuttle is used as a presentation mechanism for the head unit, thereby improving efficiency and user experience, and protecting the shuttle from damage or theft. Moreover, by removing the presenting mechanism from the head unit, the head unit can be manufactured with greater simplicity.

Figure 1B:
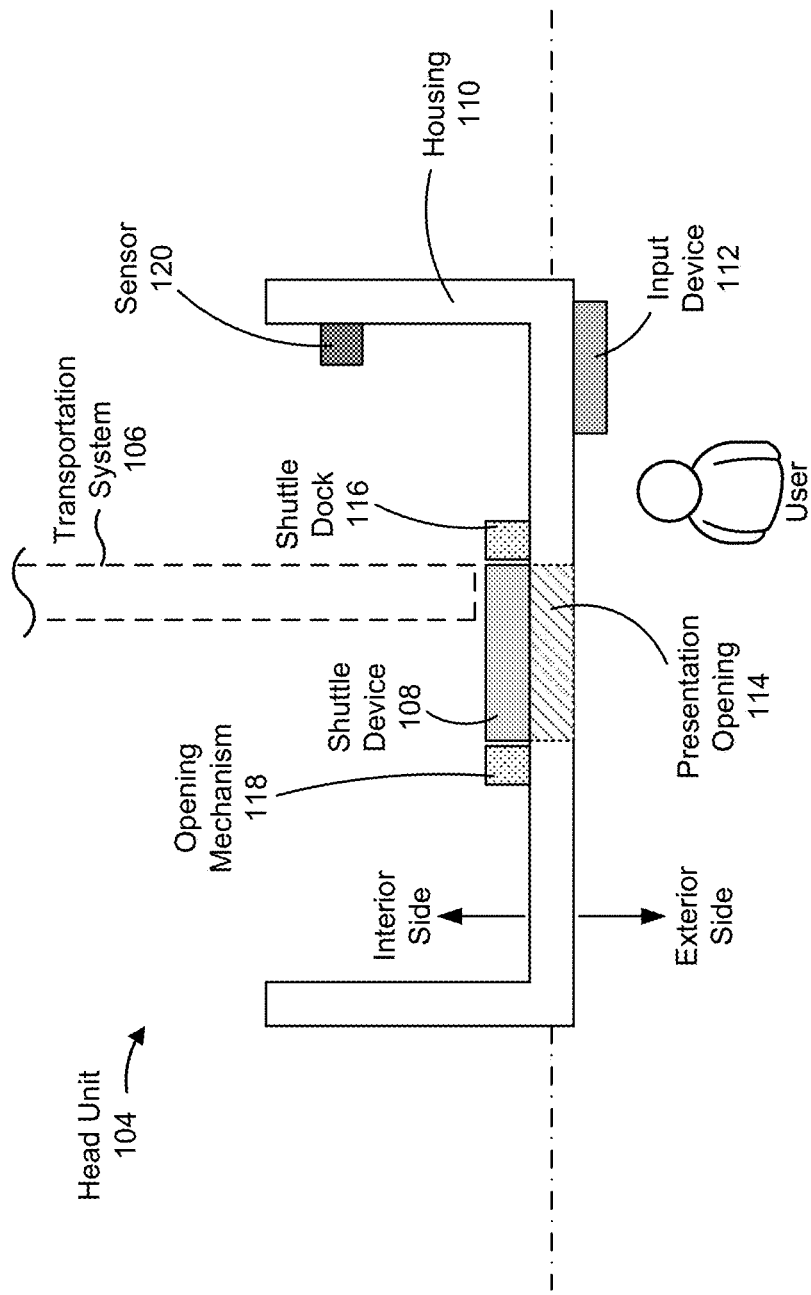
Figure 1C:
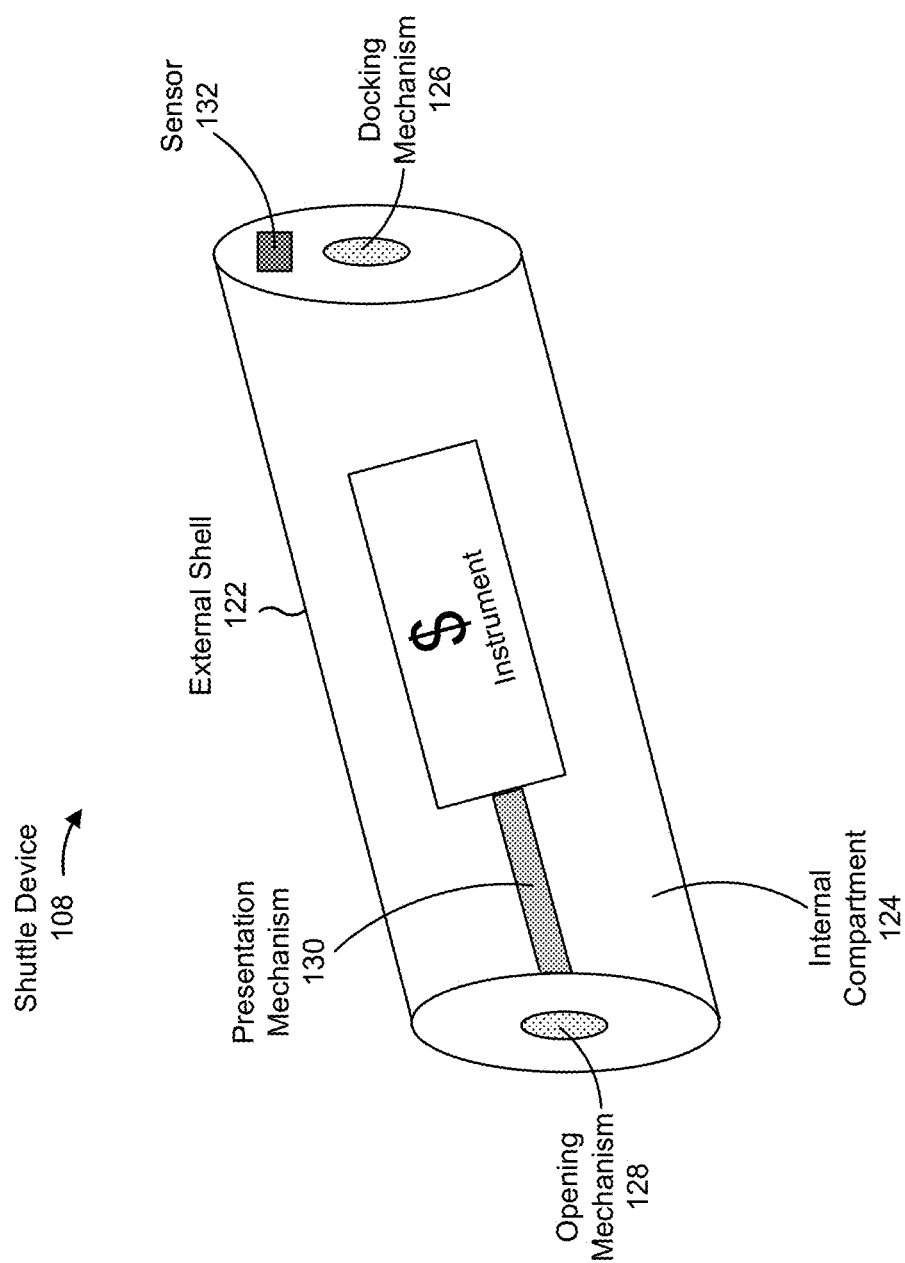

FIGS. 1A-1C are diagrams of an example implementation relating to instrument conveyance using a shuttle. FIG. 1A is a diagram of an example system 100 for instrument conveyance. As shown in FIG. 1A, the system 100 includes a handling unit 102, a head unit 104, a transportation system 106, and a shuttle device 108. These devices are described in more detail in connection with FIGS. 2 and 3. The system 100 may be used to convey one or more instruments (e.g., cash, notes, checks, deposit slips, or other bank media) between the handling unit 102 and the head unit 104. Thus, the handling unit 102 may be remotely located from the head unit 104. In other words, the handling unit 102 and the head unit 104 are not directly attached and do not share a housing.

The handling unit 102 may be configured to dispense and/or accept instruments. For example, the handling unit 102 may include one or more devices for dispensing instruments, depositing instruments, and/or recycling instruments (e.g., dispensing of deposited instruments). The handling unit 102 may include an instrument storage component configured to store instruments to be dispensed and/or instruments that have been deposited. The handling unit 102 may be located in a protected area that is not user facing or publicly accessible. For example, the handling unit 102 may be located within a building, such as in an area of the building that is not publicly accessible (e.g., in a vault or in an access-controlled area). In some implementations, the system 100 may include a plurality of handling units 102. Some of the plurality of handling units 102 may perform the same function (e.g., dispensing and/or depositing), or each of the plurality of handling units 102 may perform different functions.

The head unit 104 may be configured to obtain input from a user in connection with a transaction that involves instruments (e.g., a transaction relating to withdrawing instruments and/or depositing instruments). The head unit 104 may include one or more input devices (e.g., a touch screen and/or a keypad) configured to receive user input. The head unit 104 may be user facing and may be located in an area that is publicly accessible. For example, the head unit 104 may be located outdoors or in an area of a building that is publicly accessible. In some implementations, the system 100 may include a plurality of head units 104. The system 100 may include a quantity of head units 104 that is greater than a quantity of handling units 102 of the system 100. In this way, a relatively fewer quantity of handling units 102 may service a relatively greater quantity of head units 104, thereby enabling the system 100 to include a large quantity of head units 104 for simultaneously executing user transactions.

In some implementations, the head unit 104 may be free of an instrument storage component, as described above. In some implementations, the head unit 104 may be free of an instrument presenting mechanism, which is a mechanism that ejects instruments through an opening of the head unit 104 for retrieval by a user. An instrument presenting mechanism may include a system of rollers, conveyors, or the like, to move instruments from the instrument storage component to an exterior of the head unit 104.

The transportation system 106 may be disposed between the handling unit 102 and the head unit 104. The transportation system 106 may be configured to transport the shuttle device 108 (e.g., one or more shuttle devices, such as in concert) between the handling unit 102 and the head unit 104 (e.g., between one or more handling units 102 and one or more head units 104). The shuttle device 108 may be configured to transport instruments between the handling unit 102 and the head unit 104 via the transportation system 106. In some implementations, the transportation system 106 may be configured to transport the shuttle device 108 between the handling unit 102 and another handling unit 102 or another device that performs processing of instruments or stores instruments. Additionally, or alternatively, the transportation system 106 may be configured to transport the shuttle device 108 between the head unit 104 and another head unit 104 (e.g., for transporting a deposit at the head unit 104 to fulfill a withdrawal at the other head unit 104 without use of the handling unit 102).

The transportation system 106 may include one or more conduits, such as tubes. For example, the transportation system 106 may include a plurality of interconnecting conduits. In some implementations, the transportation system 106 may include a pneumatic source for pneumatically driving the shuttle device 108 through the transportation system 106. Additionally, or alternatively, the transportation system 106 may include rollers (e.g., drive wheels) and/or conveyors to drive the shuttle device 108. Additionally, or alternatively, the transportation system 106 and the shuttle device 108 may be configured for electromagnetic propulsion of the shuttle device 108. In some implementations, the shuttle device 108 may be autonomous and/or self-propelled through the transportation system 106 (e.g., the shuttle device 108 may include wheels or tracks that are driven by a motor of the shuttle device 108).

Each handling unit 102 of the system 100 may interface with an end, or an opening, of a conduit, and each head unit 104 of the system 100 may interface with an end, or an opening, of a conduit. Between conduit ends, the transportation system 106 may include one or more interconnecting conduit paths or branches. In this way, the transportation system 106 may transport the shuttle device 108 between any given handling unit 102 and any given head unit 104. In addition, the transportation system 106 may include one or more shuttle holding conduits (e.g., shuttle queueing/waiting areas) configured to cycle shuttles that are not being actively transported in the transportation system 106. In some implementations, shuttles that are not being actively transported in the transportation system 106 may dock at respective head units 104 to await commencement of a transaction.

In some implementations, the transportation system 106 may include switches at one or more intersections of the conduits to enable proper routing of the shuttle device 108 through the transportation system 106. Moreover, the transportation system 106 may include a plurality of sensors for tracking a location of the shuttle device 108 through the transportation system 106. For example, the transportation system 106 may include a plurality of optical sensors configured to read a marking (e.g., a barcode) on the shuttle device 108. As another example, the shuttle device 108 may include a radio-frequency identification (RFID) tag (or another short-range wireless communication tag) and the transportation system 106 may include a plurality of RFID readers configured to receive information from the RFID tag of the shuttle device 108. In some implementations, the transportation system 106 and/or the shuttle device 108 may employ dead-reckoning position tracking for tracking a location of the shuttle device 108. In some implementations, the transportation system 106 may include one or more force or pressure sensors (e.g., in a roller or a conveyor of the transportation system 106), configured to detect a presence of the shuttle device 108, for tracking a location of the shuttle device 108.

In some implementations, the system 100 may include a control system (e.g., that includes one or more memories and one or more processors communicatively coupled to the one or more memories). The control system may be centralized (e.g., the handling unit 102, the head unit 104, and/or the transportation system 106 may communicate with the centralized control system) or may be distributed among the handling unit 102, the head unit 104, and/or the transportation system 106 (e.g., the handling unit 102, the head unit 104, and/or the transportation system 106 may communicate directly with each other).

In operation of the system 100, the head unit 104 may receive (e.g., using the control system) user input via the one or more input devices of the head unit 104. The user input may relate to a transaction, that involves instruments, being performed at the head unit 104. For example, the transaction may relate to a user withdrawing one or more instruments via the head unit 104 and/or depositing one or more instruments via the head unit 104.

In the case of a deposit, the shuttle device 108 may be docked at the head unit 104 to accept the deposit from the user. For example, the head unit 104 may transmit (e.g., via the control system) a request for an empty shuttle, which may be routed to the head unit 104, via the transportation system 106, for loading. Moreover, the control system may cause docking and opening of the shuttle device 108 at the head unit 104. The user may load the instruments for deposit into the shuttle device 108, and the loaded shuttle device 108 may be transported to the handling unit 102 via the transportation system 106. For example, the control system may cause the shuttle device 108 to travel from the head unit 104 to the handling unit 102 via the transportation system 106.

The head unit 104 may transmit (e.g., via the control system) an instruction, based on the user input, to the handling unit 102. The instruction may indicate that one or more instruments are to be dispensed from the handling unit 102 (e.g., in connection with a withdrawal by the user) and/or that one or more instruments are to be deposited to the handling unit 102 (e.g., in connection with a deposit by the user). The shuttle device 108 may dock at the handling unit 102 and may automatically open (e.g., by a mechanism of the handling unit 102 and/or a mechanism of the shuttle device 108) to permit loading or unloading of instruments to the shuttle device 108. For example, based on receiving the instruction, the control system may cause the handling unit 102 to dock the shuttle device 108, and the control system may cause the handling unit 102 to open the shuttle device 108. In some implementations, the control system may cause the shuttle device 108 to be loaded to the handling unit 102 from a shuttle queue.

In the case of dispensing, the handling unit 102, in accordance with the instruction, may obtain (e.g., using one or more articulating arms, one or more conveyors, one or more rollers, and/or one or more flipping mechanisms, among other examples) the indicated instruments from the instrument storage component and load the indicated instruments into the shuttle device 108. For example, the control system may cause the handling unit 102 to load the shuttle device 108 with instruments based on the instruction. Moreover, the control system may cause the handling unit to close the shuttle device 108 after the instruments are loaded. In the case of depositing, the handling unit 102, in accordance with the instruction, may retrieve the indicated instruments from the shuttle device 108 and deposit the indicated instruments into the instrument storage component. For example, the control system may cause the handling unit 102 to retrieve the instruments from the shuttle device 108 based on the instruction. In some implementations (e.g., in the case of dispensing), the handling unit 102 may transmit (e.g., via the control system) a request for an empty shuttle, which may be routed to the handling unit 102, via the transportation system 106, for loading.

In the case of dispensing (e.g., in connection with a withdrawal by the user), the loaded shuttle device 108 may be transported to the head unit 104 via the transportation system 106. For example, the control system may cause the shuttle device 108 to travel from the handling unit 102 to the head unit 104 via the transportation system 106. The shuttle device 108 may dock at the head unit 104 and may automatically open (e.g., by a mechanism of the head unit 104 and/or a mechanism of the shuttle device 108) to permit the user to retrieve the instruments. For example, the control system may cause the head unit 104 to dock the shuttle device 108, and the control system may cause the head unit 104 to open the shuttle device 108. In some examples, the control system may determine (e.g., confirm) whether the shuttle device 108 is docked at the head unit 104 before causing the head unit 104 to open the shuttle device 108. In this way, the system 100 may facilitate user transactions, whereby the shuttle device 108 is used for transporting instruments to and from a user as well as for presenting instruments to the user.

FIG. 1B is a diagram of an example head unit 104 of the system 100. As shown, the head unit 104 may include a housing 110. The housing 110 may define an interior side of the head unit 104 and an exterior side of the head unit 104. The transportation system 106 and the shuttle device 108 may be located at the interior side of the head unit 104. The exterior side of the head unit 104 may be user facing. As described above, the head unit 104 may include at least one input device 112 configured to receive user input. The input device 112 may be mounted to the housing 110 facing the exterior side of the head unit 104.

The head unit 104 may include a presentation opening 114. The presentation opening 114 may be an aperture in the housing 110 that provides a passage between the interior side of the head unit 104 and the exterior side of the head unit 104. The presentation opening 114 may be rectangular, elliptical, or another suitable shape. In some implementations, the presentation opening 114 may be sized to prevent the shuttle device 108 from passing through the presentation opening 114 from the interior side to the exterior side of the head unit 104. That is, the presentation opening 114 may have a length and/or a width that is smaller than a length and/or a width, respectively, of the shuttle device 108. In this way, the presentation opening 114 may permit access to the shuttle device 108 from the exterior side of the head unit 104, but prevent removal of the shuttle device 108 from the interior side of the head unit 104.

The head unit 104 may include a shuttle dock 116. The shuttle dock 116 may be mounted to the housing 110 at the interior side of the head unit 104. For example, the shuttle dock 116 may be located adjacent to the presentation opening 114. The shuttle dock 116 may be configured to receive the shuttle device 108 from the transportation system 106. For example, the shuttle dock 116 may include a mechanism (e.g., an articulating arm, a conveyor, a roller, and/or a pivoting platform, among other examples) configured to transport the shuttle device 108 between the transportation system 106 and a docking location of the head unit 104. In some implementations, the shuttle dock 116 may be located at an end, or at an opening, of a conduit of the transportation system 106 that interfaces with the head unit 104 (e.g., the docking location of the head unit 104 is the end or the opening of the conduit).

The shuttle dock 116 may be configured to retain (i.e., dock) the shuttle device 108 in the head unit 104 to permit user interaction with the shuttle device 108 (e.g., to permit a user to load instruments into the shuttle device 108 or to remove instruments from the shuttle device 108). For example, the shuttle dock 116 may include a clamp configured to clamp ends of the shuttle device 108. Additionally, or alternatively, the shuttle dock 116 may include a first member of a coupling that engages with a second member of the coupling included in the shuttle device 108. For example, the coupling may include a magnetic (e.g., electromagnetic) coupling, a pin and bore coupling, and/or a threaded coupling, among other examples. The shuttle dock 116 may be further configured to release (e.g., by unclamping or uncoupling) the shuttle device 108 from the head unit 104 back to the transportation system 106. In some implementations, the shuttle dock 116 may include a sensor (e.g., a proximity sensor and/or an interlock sensor, as described below) configured to detect whether the shuttle device 108 is docked in the shuttle dock 116.

The shuttle dock 116 may be configured to dock the shuttle device 108 at the presentation opening 114. For example, the shuttle device 108 may abut the presentation opening 114 when the shuttle device 108 is docked at the presentation opening 114. As another example, contents of the shuttle device 108 may be accessible to a user via the presentation opening when the shuttle device 108 is docked at the presentation opening 114. In other words, contents of the shuttle device 108 may be directly transferrable (e.g., without any intervening conveyance mechanisms, such as rollers or conveyors) from the shuttle device 108 to the exterior side of the head unit 104 via the presentation opening 114.

The head unit 104 may include an opening mechanism 118. The opening mechanism 118 may be mounted to the housing 110 at the interior side of the head unit 104. In some implementations, the shuttle dock 116 and the opening mechanism 118 may be the same component or components of the same assembly. In some implementations, the opening mechanism 118 may be configured to perform one or more functions of the shuttle dock 116 described above.

The opening mechanism 118 may be configured to open the shuttle device 108 (e.g., when the shuttle device 108 is docked) to expose an internal compartment (internal compartment 124, as described in connection with FIG. 1C) of the shuttle device 108. That is, the opening mechanism 118 may expose the internal compartment of the shuttle device 108 to the exterior side of the head unit 104 via the presentation opening 114.

The opening mechanism 118 may be configured to move between a first position, in which the shuttle device 108 is closed, and a second position, in which the shuttle device 108 is opened. In some implementations, the opening mechanism 118 may include an actuator component (e.g., one or more motors and/or linkages) that is configured to engage with a movable member of the shuttle device 108. Thus, the actuator component may move the movable member to expose the internal compartment of the shuttle device 108. The actuator component may be a rotary actuator, such as a stepper motor (e.g., for rotating the movable member), or a linear actuator (e.g., for sliding the movable member). In some implementations, the opening mechanism 118 may be a mechanism configured to push the shuttle device 108 against the housing 110 at the presentation opening 114, such that the internal compartment of the shuttle device 108 is pushed outwardly through the presentation opening 114. In some implementations, the opening mechanism 118 may be further configured to close the shuttle device 108 to conceal the internal compartment of the shuttle device 108.

The head unit 104 may include one or more sensors 120. A sensor 120 may be mounted to the housing 110 at the interior side of the head unit 104. The sensor 120 may be oriented in the head unit 104 to collect information relating to contents of the shuttle device 108 (e.g., when the shuttle device 108 is docked at the head unit 104, when the shuttle device 108 is arriving at the head unit 104, and/or when the shuttle device 108 is leaving the head unit 104). The sensor 120 may be a proximity sensor (e.g., one or more of an optical sensor, a camera sensor, an infrared (IR) sensor, an ultrasonic sensor, a depth sensor, a three-dimensional imaging sensor, and/or a point-distance capturing sensor).

In some implementations, a sensor 120 may be an interlock sensor. For example, the interlock sensor may be a mechanical interlock, a magnetic interlock, and/or a proximity interlock (e.g., that uses wireless communication, such as RFID or near-field communication (NFC)). The interlock sensor of the head unit 104 may be configured to couple with (e.g., mechanically or wirelessly) an interlock sensor of the shuttle device 108 (e.g., to communicate a particular interlock identifier). Coupling of the respective interlock sensors may indicate arrival of the shuttle device 108 at the head unit 104. Accordingly, based on whether coupling of the respective interlock sensors is detected, the control system may cause (or prevent) docking of the shuttle device 108, opening of the shuttle device 108, and/or opening of a door that covers the presentation opening 114, among other examples. In some implementations, the transportation system 106 may include an interlock sensor (e.g., at an end of a conduit that interfaces with the head unit 104) configured to couple with the interlock sensor of the shuttle device 108, as described above.

In some implementations, the handling unit 102 may include a shuttle dock, an opening mechanism, and/or one or more sensors, in a similar manner as described above. In some implementations, the handling unit 102 may include a loading mechanism configured to load instruments into the shuttle device 108 and/or to unload instruments from the shuttle device 108 (e.g., one or more conveyors configured to slide instruments into the shuttle device 108, one or more articulating arms configured to place instruments into the shuttle device 108, and/or one or more flipping members configured to flip instruments into the shuttle device 108). In some implementations, the handling unit 102 may include a scanning component configured to process and identify instruments, identify a value of instruments, and/or identify a validity of instruments, among other examples.

FIG. 1C is a diagram of an example shuttle device 108 of the system 100. The shuttle device 108 may include an external shell 122 that defines the internal compartment 124 of the shuttle device 108. As shown, one or more instruments may be contained in the internal compartment 124 of the shuttle device 108. The shuttle device 108 may be cylindrical, as shown, or may be another suitable shape (e.g., corresponding to a shape of the conduits of the transportation system 106). The shuttle device 108 may include a movable member, as described above. The movable member may be moved (e.g., by the opening mechanism 118 of the head unit 104) from a first position, which conceals the internal compartment 124, to a second position which exposes the internal compartment 124. In some implementations, the movable member may be configured for movement by rotation, raising, lowering, sliding, or the like.

In one example, the external shell 122 may include an outer shell member and an inner shell member that are rotationally engaged. Here, the outer shell member (i.e., the movable member) may be configured to rotate relative to the inner shell member to expose the internal compartment 124. Thus, the opening mechanism 118 of the head unit 104 may be configured to rotate the outer shell member, relative to the inner shell member, to expose the internal compartment 124. In another example, the external shell 122 may include a lid member and a base member connected by a hinge (e.g., a clam shell configuration). Here, the opening mechanism 118 of the head unit 104 may be configured to raise or rotate the lid member, relative to the base member, to expose the internal compartment 124. In a further example, the external shell 122 may include a lid member and a base member that are slidably engaged (e.g., using a pin and groove connection). Here, the opening mechanism 118 of the head unit 104 may be configured to slide the lid member, relative to the base member, to expose the internal compartment 124.

The shuttle device 108 may include a docking mechanism 126 (e.g., in addition, or as an alternative, to the shuttle dock 116 of the head unit 104). For example, the shuttle device 108 may include the docking mechanism 126 on an end face of the shuttle device 108 (e.g., a base of a cylindrical shuttle device 108). The docking mechanism 126 may be configured to retain the shuttle device 108 at the head unit 104 (e.g., at the presentation opening 114 of the head unit 104), in a similar manner as described above. Additionally, or alternatively, the docking mechanism 126 may couple with the shuttle dock 116 of the head unit 104 (e.g., by a coupling, as described above), and the coupled shuttle dock 116/docking mechanism 126 may operate together to dock the shuttle device 108 at the head unit 104.

The shuttle device 108 may include an opening mechanism 128 (e.g., in addition, or as an alternative, to the opening mechanism 118 of the head unit 104). For example, the shuttle device 108 may include the opening mechanism 128 on an end face of the shuttle device 108 (e.g., a base of a cylindrical shuttle device 108). The opening mechanism 128 may be configured to open the shuttle device 108 (e.g., when the shuttle device 108 is docked) to expose the internal compartment 124 of the shuttle device 108, in a similar manner as described above. Additionally, or alternatively, the opening mechanism 128 may couple with the opening mechanism 118 of the head unit 104, and the coupled opening mechanisms 118, 128 may operate together to open the shuttle device 108.

In some examples, the opening mechanism 128 of the shuttle device 108 may include a biasing member (e.g., a spring). The biasing member may bias the shuttle device 108 (e.g., the movable member of the shuttle device 108) to an open configuration. For example, the conduit(s) of the transportation system 106 may force the shuttle device 108 into a closed configuration, but upon exiting the conduit(s), the biasing member may open the shuttle device 108. In some aspects, the shuttle device 108 may include a closing member (not shown). The closing member may also be a biasing member (e.g., a spring). Here, the biasing member may bias the shuttle device 108 (e.g., the movable member of the shuttle device 108) to a closed configuration. The opening mechanism 118 and/or the opening mechanism 128 may overcome the resistance of the biasing member in order to open the shuttle device 108. Thus, the biasing member may close the shuttle device 108 upon disengagement of the opening mechanism 118 and/or the opening mechanism 128.

The shuttle device 108 may include a presentation mechanism 130. The shuttle device 108 may include the presentation mechanism 130 in the internal compartment 124 of the shuttle device 108. The presentation mechanism 130 may be configured to grasp or contain instruments in the internal compartment 124. The presentation mechanism 130 may be configured to outwardly project instruments (e.g., that are grasped or contained) from the shuttle device 108, or otherwise position instruments for retrieval by a user. For example, the presentation mechanism 130 may include an arm that is configured to project from the shuttle device 108 when the shuttle device 108 is opened. As another example, the presentation mechanism 130 may include a drawer that is configured to project from the shuttle device 108 when the shuttle device 108 is opened.

In some implementations, the presentation mechanism 130 may operate in tandem with the movable member of the shuttle device 108 (e.g., the presentation mechanism 130 may be configured to project from the shuttle device 108 in response to opening of the shuttle device 108). For example, the presentation mechanism 130 may be tied to the movable member (e.g., by one or more linkages or other mechanisms) such that movement of the movable member causes movement of the presentation mechanism 130. As an example, opening of the movable member may cause the presentation mechanism 130 to project from the shuttle device 108, and closing of the movable member may cause the presentation mechanism 130 to withdraw into the shuttle device 108. In some implementations, the presentation mechanism 130 may include a biasing member (e.g., a spring) configured to project the presentation mechanism 130 from the shuttle device 108 when the shuttle device 108 is open. In some implementations, the shuttle device 108 may include one or more actuators configured to control a movement of the presentation mechanism 130.

The shuttle device 108 may include one or more sensors 132. A sensor 132 may be oriented in the shuttle device 108 to collect information relating to contents of the shuttle device 108 (e.g., when the shuttle device 108 is docked at the head unit 104, when the shuttle device 108 is arriving at the head unit 104, and/or when the shuttle device 108 is leaving the head unit 104), in a similar manner as described above. For example, the sensor 132 may be a proximity sensor, as described above.

The shuttle device 108 may include a power source (not shown) configured to power one or more of the docking mechanism 126, the opening mechanism 128, the presentation mechanism 130, and/or the sensor 132. For example, the power source may be a battery. Additionally, or alternatively, the shuttle device 108 may include a power connection system. The power connection system may be configured to receive power from the handling unit 102, the head unit 104, and/or the transportation system 106. For example, the power connection system may include one or more contacts (and associated wiring) on an exterior of the shuttle device 108. The one or more contacts may interface with corresponding contacts placed at the handling unit 102, the head unit 104, and/or the transportation system 106. In this way, the shuttle device 108 may receive power from the handling unit 102, the head unit 104, and/or the transportation system 106 when the one or more contacts of the shuttle device 108 and the corresponding contacts are in electrical contact. In some implementations, the shuttle device 108 may be unpowered, and any powered operations described herein (e.g., opening the shuttle device 108) may be performed by the handling unit 102, the head unit 104, and/or the transportation system 106.

In some implementations, the control system (e.g., a processor of the head unit 104 and/or a processor of the shuttle device 108) may obtain information from the sensor 120 of the head unit 104 and/or the sensor 132 of the shuttle device 108. For example, the control system may obtain the information after opening of the shuttle device 108 and/or after closing of the shuttle device 108. The information may enable the control system to determine whether contents (e.g., instruments or foreign objects) are present in the shuttle device 108. For example, the information may be proximity information that is indicative of whether contents are present in the shuttle device 108. As another example, the information may be image information, and the control system may perform a computer vision technique, using the image information, to determine whether contents are present in the shuttle device 108.

In some examples, the control system may determine, based on the information, that contents are present in the shuttle device 108. In the case of a withdrawal (e.g., the user did not retrieve the instruments or the user placed a foreign object in the shuttle device 108 after retrieving the instruments), the control system may cause the head unit 104 to provide an alert (e.g., a visual alert and/or an audible alert) indicating that contents are present in the shuttle device 108. In the case of a deposit (e.g., the user loaded the instruments to the shuttle device 108), the control system may cause the shuttle device 108 to travel from the head unit 104 to the handling unit 102.

In some examples, the control system may determine, based on the information, that contents are not present in the shuttle device 108. In the case of a withdrawal (e.g., the user retrieved the instruments from the shuttle device 108), the control system may cause the shuttle device 108 to travel from the head unit 104 to the handling unit 102 or to a shuttle queueing/waiting area. In the case of a deposit (e.g., the user has not loaded instruments into the shuttle device 108), the control system may cause the head unit 104 to provide an alert indicating that contents are not present in the shuttle device 108.

In some examples, the control system may determine, based on the information (e.g., image information), a count and/or an amount of the contents in the shuttle device 108. For example, in the case of a deposit, the control system may provide the count/amount information to the handling unit 102 prior to the shuttle device 108 arriving at the handling unit 102.

As indicated above, FIGS. 1A-1C are provided as an example. Other examples may differ from what is described with regard to FIGS. 1A-1C.

Figure 2:
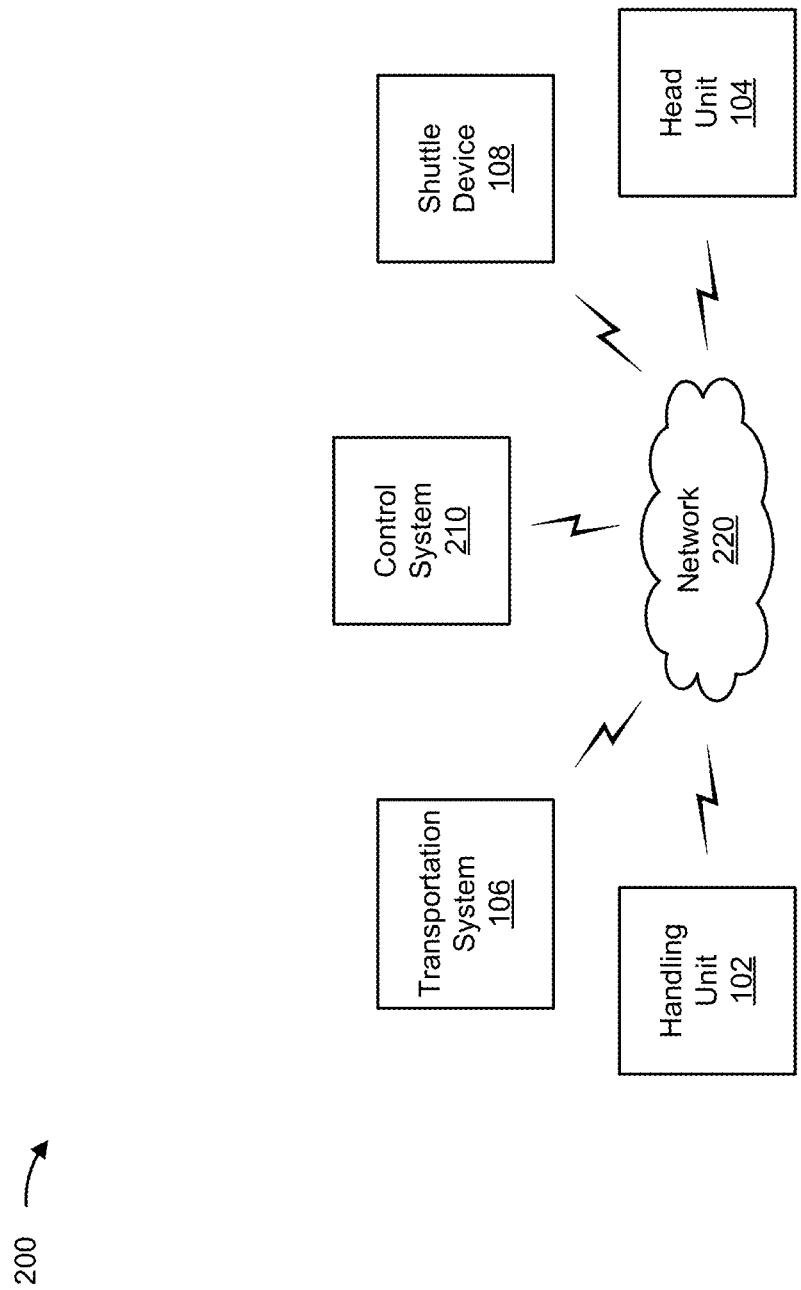
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a handling unit 102, a head unit 104, a transportation system 106, a shuttle device 108, a control system 210, and a network 220. Devices of environment 200 may interconnect via wired connections, wireless connections, or a combination of wired and wireless connections.

The handling unit 102 includes one or more devices capable of storing, dispensing, and depositing instruments. For example, the handling unit 102 may include a safe or a vault configured to safeguard instruments, such as cash. In some implementations, the handling unit 102 may include one or more computing devices. In some implementations, the handling unit 102 may provide instruments to one or more head units 104 based on transactions initiated by one or more users, as described elsewhere herein.

The head unit 104 includes one or more devices capable of interacting with a user to facilitate various types of transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), or the like. For example, the head unit 104 may be an ATM, or the head unit 104 may include one or more components of an ATM. In some implementations, the head unit 104 may receive instruments stored in and/or provided by the handling unit 102, and output the instruments to a user, as described elsewhere herein. In some implementations, the head unit 104 may include one or more computing devices.

The head unit 104 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the head unit 104 include a number keypad, a touchscreen, a magnetic stripe reader, a chip reader, and/or a radio frequency (RF) signal reader (e.g., a near-field communication (NFC) reader). Example output devices of the head unit 104 include a display and/or a speaker.

The transportation system 106 includes one or more devices capable of physically transporting instruments between devices. In some implementations, the transportation system 106 may be arranged to interface the handling unit 102 and the head unit 104, as described elsewhere herein. In some implementations, the transportation system 106 may include a plurality of interconnecting conduits, as described elsewhere herein. In some implementations, the transportation system 106 may include one or more computing devices.

The shuttle device 108 includes one or more devices capable of physically containing instruments that are transported between devices. In some implementations, the shuttle device 108 may be configured to travel within the transportation system 106. In some implementations, the shuttle device 108 may include one or more computing devices.

The control system 210 includes one or more devices capable of orchestrating operations of the handling unit 102, the head unit 104, the transportation system 106, and/or the shuttle device 108. For example, the control system 210 includes one or more devices capable of receiving, generating, storing, processing, providing, and/or routing information associated with instrument conveyance using a shuttle, as described elsewhere herein. For example, the control system 210 may include a server, such as an application server, a client server, a web server, a database server, a host server, a proxy server, a virtual server (e.g., executing on computing hardware), or a server in a cloud computing system. In some implementations, the control system 210 includes computing hardware used in a cloud computing environment. In addition, the control system 210 may be centralized or distributed among the handling unit 102, the head unit 104, the transportation system 106, and/or the shuttle device 108, as described elsewhere herein.

The network 220 includes one or more wired and/or wireless networks. For example, the network 220 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 220 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
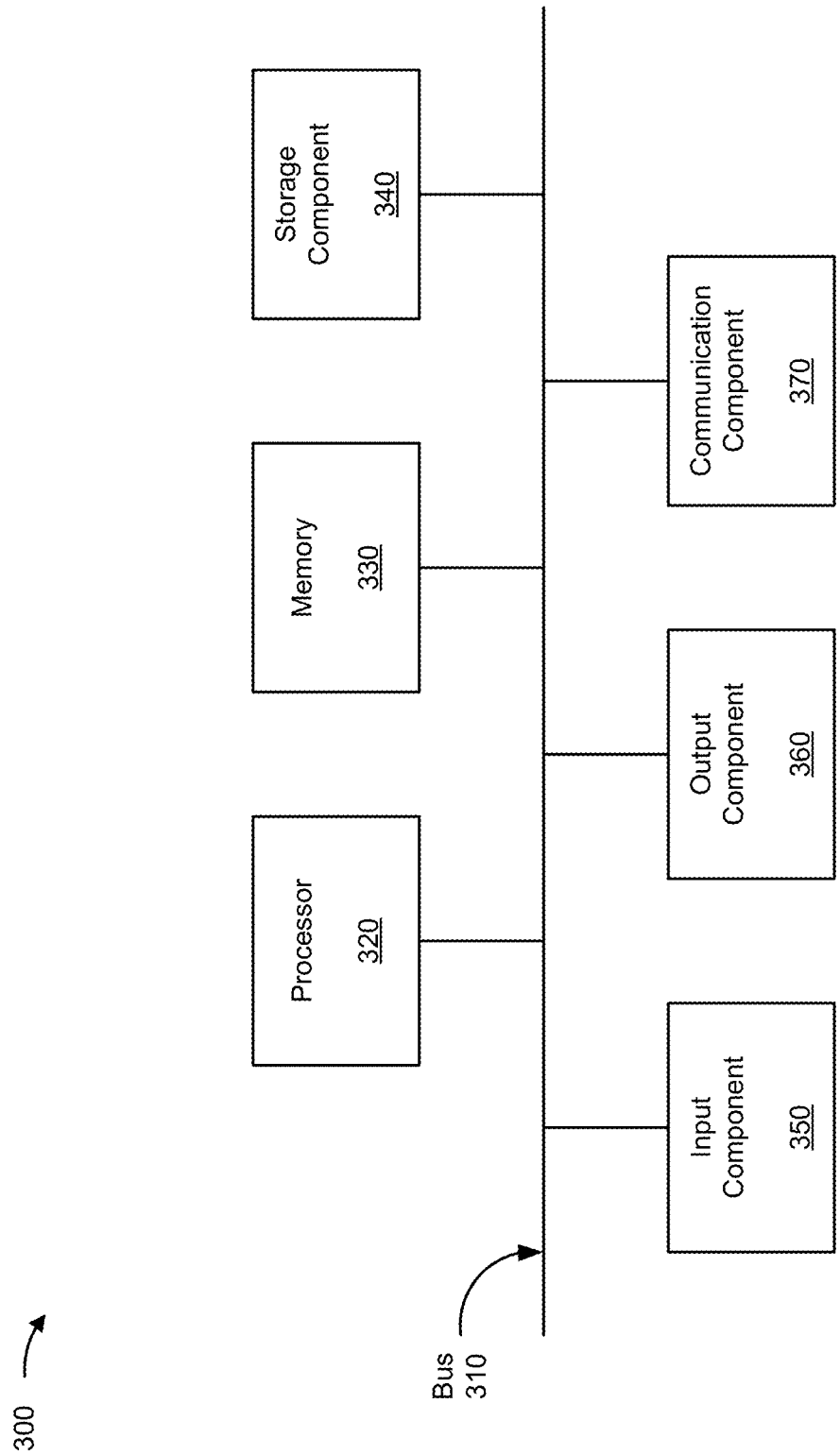
FIG. 3 is a diagram of example components of one or more devices of FIG. 2.

FIG. 3 is a diagram of example components of a device 300, which may correspond to handling unit 102, head unit 104, transportation system 106, shuttle device 108, and/or control system 210. In some implementations, handling unit 102, head unit 104, transportation system 106, shuttle device 108, and/or control system 210 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with instrument conveyance using a shuttle. In some implementations, one or more process blocks of FIG. 4 may be performed by a processor of a head unit (e.g., head unit 104). In some implementations, one or more process blocks of FIG. 4 may be performed by another device or a group of devices separate from or including the processor of the head unit, such as a processor of handling unit 102, transportation system 106, shuttle device 108, and/or control system 210. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a user input in connection with a transaction involving instruments being performed at a head unit, the head unit including a presentation opening between an interior side of the head unit and an exterior side of the head unit (block 410). As further shown in FIG. 4, process 400 may include transmitting an instruction based on the user input, where the instruction causes a handling unit to obtain one or more instruments and to load the one or more instruments into an internal compartment of a shuttle device (block 420). As further shown in FIG. 4, process 400 may include determining that the shuttle device is docked at the head unit (block 430). As further shown in FIG. 4, process 400 may include causing, based on determining that the shuttle device is docked, an opening mechanism of the head unit to open the shuttle device to expose the internal compartment to the exterior side of the head unit via the presentation opening (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for instrument conveyance, the system comprising:
    a head unit including a presentation opening between an interior side of the head unit and an exterior side of the head unit,
        wherein the head unit is configured to obtain input associated with a transaction involving an instrument;
    a handling unit configured to receive the instrument and to load the instrument into an internal compartment of a shuttle unit; and
    one or more processors configured to:
        determine that the shuttle unit is docked at the head unit,
        transmit an instruction, based on receiving the input, to cause the handling unit to obtain the instrument;
        cause an opening mechanism of the head unit to open the shuttle unit to expose the internal compartment to the exterior side of the head unit via the presentation opening;
        receive information from one or more sensors of at least one of the head unit or the shuttle unit;
        determine, based on the information, whether the internal compartment contains the instrument; and
        cause, based on determining whether the internal compartment contains the instrument, an alert to be provided or the shuttle unit to travel to the handling unit.

2. The system of claim 1, further comprising:
    a transportation unit disposed between the handling unit and the head unit,
        wherein the transportation unit comprises one or more tubes.

3. The system of claim 1, wherein the head unit further comprises a shuttle dock configured to dock the shuttle unit at the presentation opening.

4. The system of claim 1, wherein the opening mechanism is configured to open the shuttle unit to expose the internal compartment of the shuttle unit to the exterior side of the head unit via the presentation opening.

5. The system of claim 1, wherein the head unit comprises a plurality of head units,
    wherein the handling unit comprises a plurality of handling units, and
    wherein a first quantity of the plurality of head units is greater than a second quantity of the plurality of handling units.

6. The system of claim 1, wherein the information is second information,
    wherein the input associated with the transaction comprises first information,
    wherein the one or more processors are configured to receive the second information after causing the opening mechanism to open the shuttle unit to expose the internal compartment to the exterior side of the head unit via the presentation opening, and
    wherein the one or more processors are configured to determine, based on the second information, whether the shuttle unit contains the instrument.

7. The system of claim 1, wherein the handling unit is remotely located from the head unit.

8. A method of instrument conveyance, comprising:
    receiving, by one or more processors, first information associated with a transaction being performed at a head unit,
        wherein the transaction is associated with an instrument, and
        wherein the head unit includes a presentation opening between an interior side of the head unit and an exterior side of the head unit;
    transmitting, by the one or more processors and based on the first information, data that causes a handling unit to load the instrument into an internal compartment of a shuttle unit;
    obtaining, by the one or more processors, and after causing an opening mechanism of the head unit to open the shuttle unit, second information from one or more sensors of at least one of the head unit or the shuttle unit;
    determining, by the one or more processors, and based on the second information, whether the shuttle unit contains the instrument; and
    causing, based on determining whether the internal compartment of the shuttle unit contains the instrument, at least one of:
        an alert to be transmitted, or
        the shuttle unit to travel to the handling unit.

9. The method of claim 8, further comprising:
causing the shuttle unit to travel in a transportation unit from the handling unit to the head unit.

10. The method of claim 8, wherein the handling unit is remotely located from the head unit.

11. The method of claim 8, wherein the head unit is associated with a plurality of head units, and
wherein a first quantity of the plurality of head units is greater than a second quantity of a plurality of handling units that include the handling unit.

12. A device, comprising:
one or more memories; and
one or more processors, coupled to the one or more memories, configured to:
receive first information associated with a transaction being performed at a head unit,
wherein the transaction is associated with an instrument, and
wherein the head unit includes a presentation opening between an interior side of the head unit and an exterior side of the head unit;
transmit, based on the first information, data that causes a handling unit to load the instrument into an internal compartment of a shuttle unit;
obtain, after causing an opening mechanism of the head unit to open the shuttle unit, second information from one or more sensors of at least one of the head unit or the shuttle unit;
determine, based on the second information, whether the shuttle unit contains the instrument; and
cause, based on determining whether the internal compartment of the shuttle unit contains the instrument, at least one of:
an alert to be provided, or
the shuttle unit to travel to the handling unit.

13. The device of claim 12, wherein the handling unit is remotely located from the head unit.

14. The device of claim 12, wherein the head unit is associated with a plurality of head units, and
wherein a first quantity of the plurality of head units is greater than a second quantity of a plurality of handling units that include the handling unit.

15. The device of claim 12, wherein the one or more processors are further configured to:
cause the shuttle unit to travel in a transportation unit from the handling unit to the head unit.

16. The system of claim 1, wherein the head includes a proximity sensor or an interlock sensor.

17. The system of claim 1, wherein the shuttle unit includes a docking mechanism on an end face of the shuttle unit, and the opening mechanism on another end face of the shuttle unit.

18. The method of claim 8, wherein the shuttle unit includes a docking mechanism on an end face of the shuttle unit, and the opening mechanism on another end face of the shuttle unit.

19. The method of claim 8, wherein the head unit includes a proximity sensor or an interlock sensor.

20. The device of claim 12, wherein the shuttle unit includes a docking mechanism on an end face of the shuttle unit, and the opening mechanism on another end face of the shuttle unit.

* * * * *